US010372213B2

(12) United States Patent
Keller et al.

(10) Patent No.: US 10,372,213 B2
(45) Date of Patent: Aug. 6, 2019

(54) COMPOSITE RIBBON IN A VIRTUAL REALITY DEVICE

(71) Applicant: Facebook Technologies, LLC, Menlo Park, CA (US)

(72) Inventors: Sean Jason Keller, Kirkland, WA (US); David R. Perek, Bellevue, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 296 days.

(21) Appl. No.: 15/270,225

(22) Filed: Sep. 20, 2016

(65) Prior Publication Data
US 2018/0081436 A1    Mar. 22, 2018

(51) Int. Cl.
G06F 3/01    (2006.01)
A41D 19/00    (2006.01)
G02B 27/01    (2006.01)

(52) U.S. Cl.
CPC .............. *G06F 3/016* (2013.01); *G06F 3/014* (2013.01); *A41D 19/0024* (2013.01); *G02B 27/017* (2013.01); *G02B 2027/014* (2013.01)

(58) Field of Classification Search
CPC .................................. G06F 3/016; G06F 3/014
See application file for complete search history.

(56) References Cited

U.S. PATENT DOCUMENTS

| 4,948,951 A | * | 8/1990 | Balzano | A41D 19/01535 219/211 |
| 4,988,981 A | * | 1/1991 | Zimmerman | A61B 5/1114 345/156 |
| 5,354,162 A | * | 10/1994 | Burdea | A61F 5/0118 414/4 |
| 5,442,729 A | * | 8/1995 | Kramer | A61B 5/6806 128/925 |

(Continued)

FOREIGN PATENT DOCUMENTS

| CN | 202043665 | * | 11/2011 |
| CN | 204378001 | * | 6/2015 |

(Continued)

*Primary Examiner* — Nitin Patel
*Assistant Examiner* — Robert M Stone
(74) *Attorney, Agent, or Firm* — Fenwick & West LLP (57) ABSTRACT

A haptic glove comprises a glove body including a glove digit corresponding to a phalange of a user hand. The glove digit has a first ribbon layer of a first average width and a second ribbon layer of a second average width greater than the first average width. The first and second ribbon layers are configured to be positioned on a first surface of the digit and formed lengthwise along a bend centerline of the glove digit that bisects a surface of the glove digit. A central axis of the second ribbon layer is aligned with a central axis of the first ribbon layer. The first ribbon layer comprises a first extendible material having a first range of elastic extensibility and the second ribbon layer comprises a second extendible material having a second range of elastic extensibility greater than the first range of elastic extensibility of the first ribbon layer.

19 Claims, 5 Drawing Sheets

(56) References Cited

U.S. PATENT DOCUMENTS

| | | | | |
|---|---|---|---|---|
| 5,796,354 A * | 8/1998 | Cartabiano | ............ | G06F 3/014 273/148 B |
| 6,128,004 A * | 10/2000 | McDowall | ............ | G06F 3/014 345/156 |
| 6,452,584 B1 * | 9/2002 | Walker | ............ | G06F 3/014 345/158 |
| 6,454,681 B1 * | 9/2002 | Brassil | ............ | A63B 23/16 482/47 |
| 6,701,296 B1 * | 3/2004 | Kramer | ............ | A61B 5/6806 370/545 |
| 7,562,572 B2 * | 7/2009 | You | ............ | G01L 1/205 73/379.03 |
| 8,198,542 B2 * | 6/2012 | Lee | ............ | H05K 1/0218 174/250 |
| 8,686,947 B2 * | 4/2014 | Wine | ............ | G06F 1/163 345/169 |
| 9,030,307 B1 * | 5/2015 | Lee | ............ | G06F 3/017 340/407.1 |
| 9,104,271 B1 * | 8/2015 | Adams | ............ | G06F 3/0426 |
| 9,710,060 B2 * | 7/2017 | McMillen | ............ | H03K 17/964 |
| 9,775,769 B2 * | 10/2017 | Brown | ............ | A61H 23/02 |
| 2001/0011606 A1 * | 8/2001 | Bergstedt | ............ | H05K 1/162 174/260 |
| 2002/0126026 A1 * | 9/2002 | Lee | ............ | G06F 3/014 341/22 |
| 2003/0234823 A1 * | 12/2003 | Sato | ............ | G06F 3/013 715/848 |
| 2005/0127057 A1 * | 6/2005 | Rock | ............ | H05B 3/342 219/211 |
| 2006/0006168 A1 * | 1/2006 | Rock | ............ | A41D 31/0038 219/545 |
| 2011/0018556 A1 * | 1/2011 | Le | ............ | H03K 17/955 324/654 |
| 2012/0157263 A1 * | 6/2012 | Sivak | ............ | G06F 3/014 482/4 |
| 2013/0085394 A1 * | 4/2013 | Corbett, III | ............ | A61B 8/12 600/462 |
| 2013/0162632 A1 * | 6/2013 | Varga | ............ | G06T 19/006 345/419 |
| 2014/0275883 A1 * | 9/2014 | Haisley | ............ | A61B 5/14552 600/324 |
| 2014/0336669 A1 * | 11/2014 | Park | ............ | A61B 34/30 606/130 |
| 2015/0130698 A1 * | 5/2015 | Burgess | ............ | G06F 1/163 345/156 |
| 2015/0189753 A1 * | 7/2015 | Goyal | ............ | H05K 1/0283 361/803 |
| 2015/0257733 A1 * | 9/2015 | Corbett, III | ............ | A61B 8/4455 600/440 |
| 2016/0025682 A1 * | 1/2016 | Walker | ............ | G01N 27/9033 324/222 |
| 2016/0054797 A1 * | 2/2016 | Tokubo | ............ | G06F 3/012 345/633 |
| 2016/0169754 A1 * | 6/2016 | Kowalewski | ............ | G01L 5/228 73/862.046 |
| 2016/0187973 A1 * | 6/2016 | Shankar | ............ | G06F 3/014 345/156 |
| 2016/0363997 A1 * | 12/2016 | Black | ............ | G06F 3/014 |
| 2017/0098333 A1 * | 4/2017 | Varga | ............ | G06T 19/006 |
| 2017/0160807 A1 * | 6/2017 | Keller | ............ | G06F 3/016 |
| 2017/0165567 A1 * | 6/2017 | Walters | ............ | A63F 13/285 |
| 2017/0168576 A1 * | 6/2017 | Keller | ............ | G06F 3/016 |
| 2017/0176267 A1 * | 6/2017 | Keller | ............ | G01L 1/144 |
| 2017/0215495 A1 * | 8/2017 | Okumiya | ............ | A41D 19/0013 |
| 2017/0262056 A1 * | 9/2017 | Osman | ............ | G06F 3/014 |
| 2017/0300115 A1 * | 10/2017 | Kerr | ............ | G06F 3/016 |
| 2017/0354816 A1 * | 12/2017 | Huelman | ............ | A61N 1/0432 |
| 2017/0371416 A1 * | 12/2017 | Zeitler | ............ | G06F 3/016 |

FOREIGN PATENT DOCUMENTS

| | | | |
|---|---|---|---|
| CN | 204868848 | * | 12/2015 |
| CN | 205622969 | * | 10/2016 |
| CN | 106617411 | * | 5/2017 |
| CN | 206282234 | * | 6/2017 |
| KR | 1738870 | * | 5/2017 |
| WO | 2017114148 | * | 7/2017 |
| WO | WO-2017114277 A1 * | 7/2017 | ............ H05K 1/00 |

* cited by examiner

COMPOSITE RIBBON IN A VIRTUAL REALITY DEVICE

BACKGROUND

Virtual reality (VR) is a simulated environment created by computer technology, and augmented reality (AR) is a live direct or indirect view of a physical, real-world environment whose elements are augmented (or supplemented) by computer technology. VR or AR can be presented to a user through a VR/AR system. Typically, a VR/AR system includes a VR/AR headset that provides visual and audio information to the user. Conventional VR/AR systems create virtual body parts (e.g., a virtual hand) in the simulated environment and use a tracking system to track a user movement in a physical space. The simulated environment presented to the user may be updated according to the user movement in the physical space. However, such systems generally do not prevent or control the user movement in the physical space, as the user is in contact with virtual objects in the simulated environment. As a result, these systems generally are not able to provide haptic feedback in which a user perceives a sensation of touching an object in the virtual realm.

SUMMARY

Embodiments relate to a haptic feedback mechanism that provides haptic feedback to a user wearing the haptic feedback mechanism (e.g., a glove) over a portion of their body. The haptic feedback mechanism provides an amount of a resistance to a physical movement of the portion of the user wearing the haptic feedback mechanism, according to a virtual position corresponding to a physical position of the portion of the user. The haptic feedback facilitates an illusion that a user is interacting with a real object, when in fact the object is a virtual object.

The haptic feedback mechanism includes a composite extendible ribbon coupled to (e.g., attached to, embroidered into, intertwined into, or any combination thereof) a glove digit of a glove body. The glove digit is configured to be worn around a phalange of a user hand and the composite ribbon includes a first ribbon layer and a second ribbon layer positioned parallel to the bend centerline of the phalange of the user hand. The first ribbon layer has a first average width and the second ribbon layer has a second average width greater than the first average width. The first and second ribbon layers are configured to be positioned on a first surface of the digit and positioned lengthwise along a bend centerline of the glove digit. A central axis of the second ribbon layer is aligned with a central axis of the first ribbon layer. The first ribbon layer comprises a first extendible material having a first range of elastic extensibility and the second ribbon layer comprises a second extendible material having a second range of elastic extensibility greater than the first range of elastic extensibility of the first ribbon layer.

Additionally, in some embodiments, one or more actuators may be coupled to the glove body and configured to control movement of the first and second ribbon layers by actuating the first and second ribbon layers.

Although discussed in terms of VR systems, devices described herein can be used with AR systems and any other feedback/control interfaces designed to give users a more immersive experience within a computing environment.

DETAILED DESCRIPTION

System Overview

Figure 1:
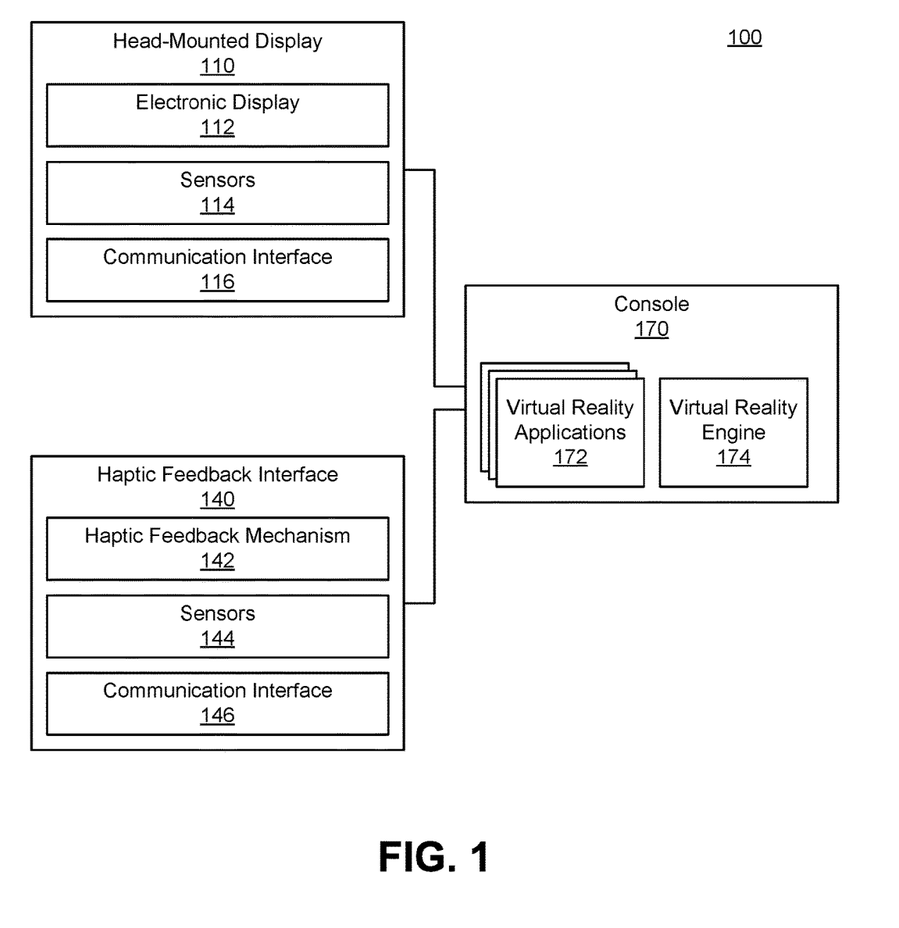
FIG. 1 is a block diagram of a system including a haptic feedback interface, in accordance with an embodiment.

FIG. 1 is a block diagram of a system 100 in which a haptic feedback interface 140 operates, according to one or more embodiments. In some embodiments, the system 100 operates in augmented reality (AR) and/or mixed reality (MR) environments. The system 100 shown in FIG. 1 comprises a head-mounted display (HMD) 110 and a haptic feedback interface 140 that are both coupled to a console 170. While FIG. 1 shows an example system 100 including one HMD 110 and one haptic feedback interface 140, in other embodiments any number of these components may be included in the system 100. For example, the system 100 may include two haptic feedback interfaces 140 (e.g., one for each hand) that are worn by the same user. As another example, the system 100 may include multiple VR input interfaces 140 intended to be worn by multiple users, with each haptic feedback interface 140 or each pair of VR input interfaces 140 associated with a different HMD 110. In alternative configurations, different and/or additional components may be included in the system 100.

The HMD 110 is a head-mounted display that presents media to a user. Examples of media presented by the HMD 110 include images, video, audio, or some combination thereof. In some embodiments, audio is presented via an external device (e.g., speakers and/or headphones) that receives audio information from the HMD 110, the console 170, or both, and presents audio data based on the audio information. The HMD 110 may augment views of a physical, real-world environment with computer-generated elements (e.g., images, video, sound, etc.).

The HMD 110 includes an electronic display 112, sensors 114, and a communication interface 116. The electronic display 112 displays images to the user in accordance with data received from the console 170. In various embodiments, the electronic display 112 may comprise a single electronic display 112 or multiple electronic displays 112 (e.g., one display for each eye of a user).

The sensors 114 include one or more hardware devices that detect spatial and motion information about the HMD 110. Spatial and motion information can include information about the position, orientation, velocity, rotation, and acceleration of the VR headset 110. For example, the sensors 114 may include a gyroscope that detects rotation of the user's head while the user is wearing the HMD 110. This rotation information can then be used (e.g., by the VR engine 174) to adjust the images displayed on the electronic display 112.

The communication interface 116 enables input and output to the console 170. In some embodiments, the communication interface 116 is a single communication channel, such as High-Definition Multimedia Interface (HDMI), Universal Serial Bus (USB), Video Graphics Array (VGA), Digital Visual Interface (DVI), DISPLAYPORT™, some other communication channel, or some combination thereof. In other embodiments, the communication interface 116 includes several distinct communication channels operating together or independently. In one embodiment, the communication interface 116 includes wireless connections for sending data collected by the sensors 114 from the HMD 110 to the console 170 but also includes a wired HDMI connection or DVI connection that receives audio/visual data to be rendered on the electronic display 112.

The haptic feedback interface 140 is a garment configured to be worn on a portion of a user's body, such as the user's hand. The haptic feedback interface 140 collects information about the portion of the user's body that can be used as input for virtual reality applications 172 executing on the console 170. In the illustrated embodiment, the haptic feedback interface 140 includes a haptic feedback mechanism 142, sensors 144, and a communication interface 146. The haptic feedback interface 140 may include additional components that are not shown in FIG. 1, such as a power source (e.g., an integrated battery, a connection to an external power source, a container containing compressed air, or some combination thereof).

The haptic feedback mechanism 142 provides haptic feedback to the user by directing the portion of the user's body to move in a particular way or in a particular direction or preventing the portion of the user's body from moving in certain directions or in certain ways. To move a portion of the user's body or apply torque to a joint in the user's body, the haptic feedback mechanism 142 includes a composite extendible ribbon to apply distributed force to the garment. Various embodiments of the haptic feedback mechanism 142 are described in conjunction with FIGS. 2-5.

The sensors 144 include one or more hardware devices that detect spatial and motion information about the haptic feedback interface 140. Spatial and motion information can include information about the position, orientation, velocity, rotation, and acceleration of the haptic feedback interface 140 or any subdivisions of the haptic feedback interface 140. For example, if the haptic feedback interface 140 is a glove, sensors 144 identify positions and orientations of various portions of the glove, such as the fingers, fingertips, knuckles, palm, or wrist.

The communication interface 146 enables input and output to the console 170. In some embodiments, the communication interface 146 is a single communication channel, such as USB. In other embodiments, the communication interface 146 includes several distinct communication channels operating together or independently. For example, the communication interface 146 may include separate communication channels for receiving control signals for the haptic feedback mechanism 142 and sending data from the sensors 144 to the console 170. The one or more communication channels of the communication interface 146 can be implemented as wired or wireless connections.

The console 170 is a computing device that executes virtual reality applications to process input data from the sensors 114 and 144 on the VR headset 110 and haptic feedback interface 140 and provide output data for the electronic display 112 on the VR headset 110 and the haptic feedback mechanism 142 on the haptic feedback interface 140. The console 170 may be integrated with the VR headset 110 or the haptic feedback interface 140. The console 170 can be implemented as any kind of computing device, such as an integrated system-on-a-chip, a microcontroller, a desktop or laptop computer, a server computer, a tablet, a smart phone, or other mobile device. Thus, the console 170 includes that includes components common to typical computing devices, such as a processor, random access memory, a storage device, a network interface, an I/O interface, and the like.

The processor may be or include one or more Graphics Processing Units (GPUs), microprocessors, or Application Specific Integrated Circuits (ASICs). The memory may be or include Random Access Memory (RAM), Read Only Memory (ROM), Dynamic Random-Access Memory (DRAM), Static Random-Access Memory (SRAM), and Magnetoresistive Random-Access Memory (MRAM), and may include firmware, such as static data or fixed instructions, Basic Input/Output System (BIOS), system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, Compact Disc (CD), Digital Versatile Disc (DVD), or other reasonably high capacity addressable or serial storage medium. Multiple storage devices may be positioned or be available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, depending upon the computing device, sensors, displays, cameras, color sensors, microphones, keyboards and USB devices.

In the example shown in FIG. 1, the console 170 further includes VR applications 172 and a virtual reality (VR) engine 174. In some embodiments, the VR applications 172 and the VR engine 174 are implemented as software modules that are stored on the storage device and executed by the processor. Some embodiments of the console 170 include additional or different components than those described in conjunction with FIG. 1. Similarly, the functions further described below may be distributed among components of the console 170 in a different manner than is described here.

Each VR application 172 is a group of instructions that, when executed by a processor, generates virtual reality content for presentation to the user. A VR application 172 may generate VR content in response to inputs received from the user via movement of the HMD 110 or the haptic feedback interface 140. Examples of VR applications 172 include gaming applications, conferencing applications, video playback applications, augmented reality application, or other suitable applications.

The VR engine 174 is a software module that allows VR applications 172 to operate in conjunction with the HMD 110 and haptic feedback interface 140. In some embodiments, the VR engine 174 receives information from sensors 114 on the HMD 110 and provides the information to a VR application 172. Based on the received information, the VR engine 174 determines media content to provide to the HMD 110 for presentation to the user via the electronic display 112 and/or haptic feedback to provide to the haptic feedback interface 140 to provide to the user via the haptic feedback mechanism. For example, if the VR engine 174 receives information from the sensors 114 on the HMD 110 indicating that the user has looked to the left, the VR engine 174 generates content for the HMD 110 that mirrors the user's movement in a virtual environment.

Similarly, in some embodiments the VR engine 174 receives information from the sensors 144 on the haptic feedback interface 140 and provides the information to a VR application 172. The VR application 172 can use the information to perform an action within the virtual world of the VR application 172. For example, if the VR engine 174 receives information from the sensors 144 that the user has closed his fingers around a position corresponding to a coffee mug in the virtual environment and raised his hand, a simulated hand in the VR application 172 picks up the virtual coffee mug and lifts it to a corresponding height.

The VR engine 174 may also provide feedback to the user that the action was performed. The positioned feedback may be visual via the electronic display 112 in the HMD 110 (e.g., displaying the simulated hand as it picks up and lifts the virtual coffee mug) or haptic feedback via the haptic feedback mechanism 142 in the haptic feedback interface 140 (e.g., preventing the user's finger's from curling past a certain point to simulate the sensation of touching a solid coffee mug).

Glove Digit with Actuated Composite Ribbon

Figure 2:
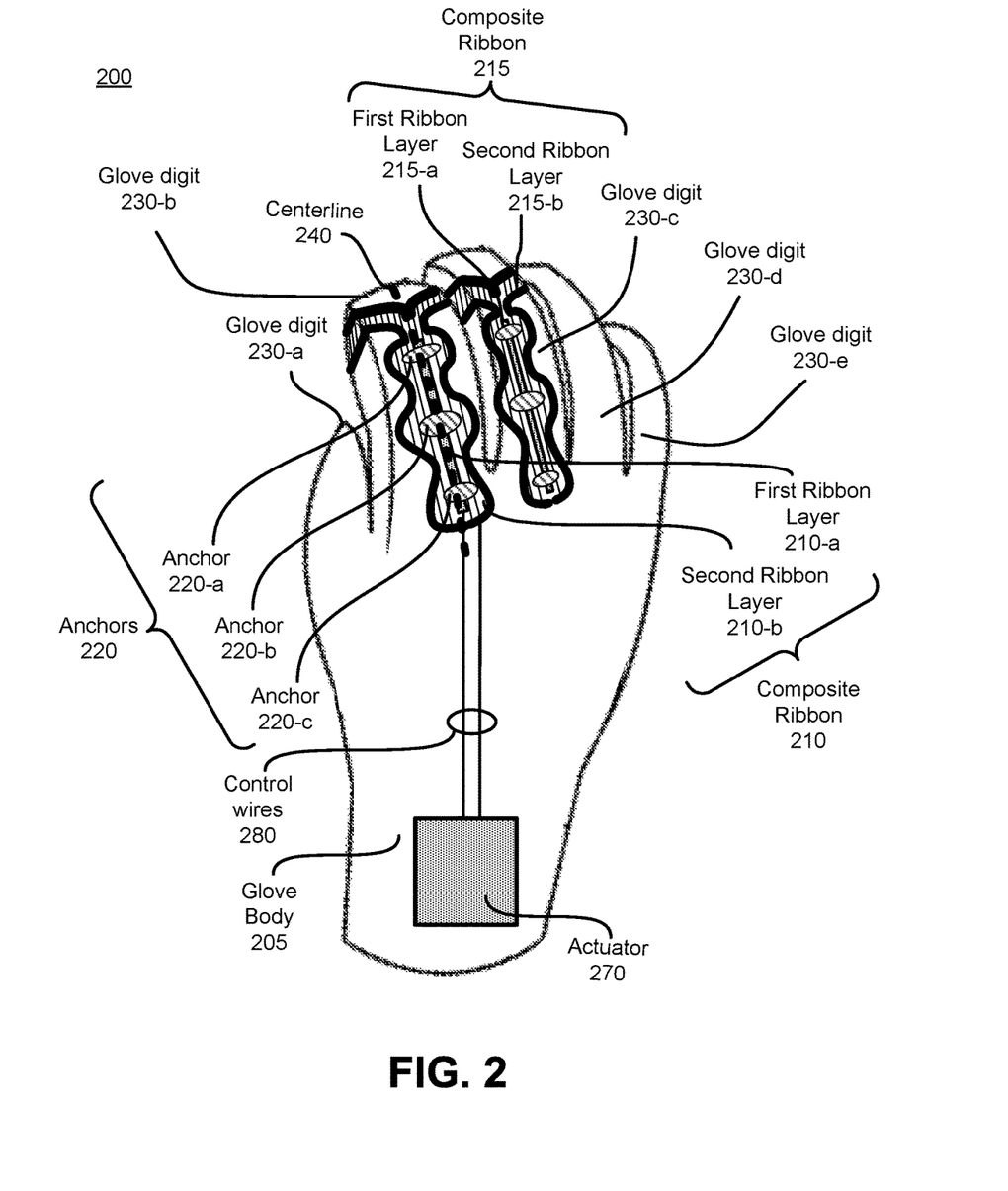
FIG. 2 illustrates a perspective view of a haptic glove, in accordance with one or more embodiments.

FIG. 2 illustrates a perspective view of a haptic glove 200, in accordance with one or more embodiments. The haptic glove 200 includes a glove body 205 having glove digits 230-a, 230-b, 230-c, 230-d, and 230-e, and an actuator 270. One or more of the glove digits may be provide haptic feedback to a wearer of the haptic glove. For example, as illustrated, haptic glove digits 230-b and 230-c may provide haptic feedback to the user via respective composite ribbons 210 and 215. In alternate embodiments, other glove digits may include composite ribbons configured to provide haptic feedback.

The glove body 205 may be made of any garment and may be any item of clothing that conforms to a portion of the user's hand and phalanges. The garment may include a textile fabric, but may also include other materials such as rubber, leather, fur, a polymer, or a combination thereof. The garment may include multiple layers. Alternatively or additionally, the garment includes textile meshes. A textile mesh includes a network or lattice of textile segments to distribute force exerted by a composite ribbon through the glove digit 230. A textile segment may be a thread or string made of a natural material (e.g., cotton, hemp) or synthetic material (e.g., nylon, polyester). The textile mesh may be enclosed between two layers of the garment to prevent friction on the user's skin. The textile segments may be anchored to each other, to the garment, or both.

In some embodiments, an extendible composite ribbon 210 is positioned along a length of the glove digit to restrict movement of the glove digit and consequently restrict movement of a phalange wearing the glove digit. As illustrated in FIG. 2, the composite ribbon 210 includes a first ribbon layer 210-a and a second ribbon layer 210-b, that are coupled to a first surface of the glove digit 230-b (e.g., a top surface of the glove digit 230-b corresponding to a back side of a phalange of the user hand). Similarly, the composite ribbon 215 includes a first ribbon layer 215-a and a second ribbon layer 215-b, that are coupled to a first surface of the glove digit 230-c (e.g., a top surface of the glove digit 230-c corresponding to a back side of a phalange of the user hand). For example, the composite ribbon 210 may actually be in contact with a surface of a phalange wearing the glove digit, or be separated from the surface of the phalange by some material (e.g., composite ribbon 210 may be inside of or on the exterior of material which makes up a glove digit). Lengths of the first and second ribbon layers 210-a and 210-b are parallel to a bend centerline 240 of the phalange, and the first and second ribbon layers are coupled respectively on a first and a second side of the bend centerline 240 of the glove digit. The bend centerline 240 of the glove digit is a central axis bisects a surface of the glove digit and that extends along a length of the glove digit from a tip (e.g., end) of the glove digit to a base of the glove digit (e.g., region attaching the glove digit to a portion of the glove body corresponding to the palms of the user hand). The bend centerline 240 interconnects bend locations of the glove digit that correspond to the joints of the phalange at which the glove digit undergoes bends responsive to bending of the phalange. The bend centerline 240 is oriented perpendicular to bend lines along which the digit is configured to bend at the bend locations.

As illustrated in FIG. 2, the composite ribbon 210 is positioned on (e.g., attached to, embroidered into, intertwined into, or any combination thereof) a glove digit 230-b of the glove body 205. The composite ribbon 210 includes the first and second ribbon layers 210-a and 210-b located lengthwise along the bend centerline 240 of the phalange of the user hand.

In some embodiments, the first ribbon layer 210-a is wider than the second ribbon layer 210-b. In other words, the first ribbon layer 210-a has a first average width and the second ribbon layer 210-b has a second average width greater than the first average width. The first and second ribbon layers 210-a and 210-b are configured to be positioned on a first surface of the digit 230-b and positioned lengthwise along a bend centerline 240 of the phalange wearing the glove digit 230-b. A central axis of the second ribbon layer 210-b is aligned with a central axis of the first ribbon layer.

The first and second ribbon layers 210-a and 210-b may be any material to translate force from the actuator 270. For example, the first and second ribbon layers 210-a and 210-b may include a wire, string, rod, other rigid structure, or an elastic structure. The first and second ribbon layers 210-a and 210-b may have variable thickness elements. In some embodiments, the first and second ribbon layers 210-a and 210-b may also exert or resist a lateral force to jam an adjacent portion of the user's body.

The first ribbon layer 210-a comprises a first extendible material having a first range of elastic extensibility. The first ribbon layer 210-a may be composed of, e.g., silicon, polyethylene, rubber, derivatives thereof, or some combination thereof. The first ribbon layer 210-a may have a range of elasticity of, e.g., 5-50 MPa (megapascal). Additionally, the first ribbon layer 210-a is generally sized to match a length of a finger. In alternate embodiments, the first ribbon layer 210-a may have some other size. The second ribbon layer 210-b comprises a second extendible material having a second range of elastic extensibility. The second ribbon layer 210-b may be composed of, e.g., Kapton, hard plastics, rubber, derivatives thereof, or some combination thereof. The second ribbon layer 210-b may have a range of elasticity of, e.g., 1-5 GPa. Additionally, the second ribbon layer 210-b is generally sized to match a length of a finger. In alternate embodiments, the first ribbon layer 210-a may have some other size. In some embodiments, the second ribbon layer 210-b is more elastic than the first ribbon layer 210-a. For example, the second range of elastic extensibility is greater than the first range of elastic extensibility of the first ribbon layer 210-a. In some embodiments, the second ribbon layer 210-b is made of Kapton and is can undergo a greater measure of deformation than the first ribbon layer 210-a.

In some embodiments, the glove digit 230-b of the glove body 205 includes a plurality of anchors 220 (including anchors 22-a, 220-b, and 220-c), each anchor connected to both the first ribbon layer 210-*a* and to the second ribbon layer 210-*b*. Each anchor is placed at a respective bend location of the glove digit expected to be positioned at a joint of the phalange of the user hand. In alternative embodiments, the first ribbon layer 210-*a* and the second ribbon layer 210-*b* have holes at the bend locations. For instance, an anchor may include a hole positioned through a portion of the fabric or may correspond to a loop attached to the fabric. The hole accommodates a knuckle of a finger, such that the knuckle presses through the hole and acts to fix the anchor to the knuckle. For example, the anchor is a loop attached to one textile segment that allows another textile segment to slide through the loop. As another example, the anchor may include a metal ring having a diameter greater than the ribbon layers.

The anchors 220 may be attached to the garment of the glove digit 230. The anchors 220 (including anchor 220-*a*, 220-*b*, and 220-*c*) mechanically couple (e.g., fix) the composite ribbon 210 to the joints of the phalange. In some embodiments, an anchor 220 constrains lateral movement (e.g., movement perpendicular to the centerline 240) of each of the ribbon layers 210-*a* and 210-*b* relative to a joint. But ribbon layers 210-*a* and 210-*b* may slide longitudinally (e.g., parallel to the centerline 240) relative to the anchors 220. The anchors 220 may also be mechanically coupled to the garment of digit 230 of the glove to distribute force applied by the composite ribbon 210 over areas of the garment rather than as point forces. The ribbon layers 210-*a* and 210-*b* may slip longitudinally (e.g., parallel to the centerline 240) relative to the anchor 220, but an end of the ribbon layers 210-*a* and 210-*b* may also be longitudinally fixed to an anchor 220 (referred to as a terminal anchor).

In some embodiments, the composite ribbon 210 and anchors 220 may be enclosed, embroidered, intertwined or any combination thereof between two or more layers of the garment. The anchors 220 typically conform to a portion of the user's body (e.g., the joints) and may be any material more rigid than the garment of the glove body 205. For example, the anchor forms an arc around the joint of a user's finger.

In some embodiments, the first ribbon layer 210-*a* is less flexible and has a lower range of elastic extendibility than the second ribbon layer 210-*b*. In such embodiments, the first ribbon layer 210-*a* stretches until a predefined threshold deformed length corresponding to a predefined threshold bend angle of the finger. In such embodiments, for any bending of the finger beyond the predefined threshold bend angle, the first ribbon layer 210-*a* does not undergo further deformation and rather remains at predefined threshold deformed length despite further bending of the finger past the predefined threshold bend angle. Instead, responsive to a bend angle of the phalange being greater than the threshold bend angle, a width of the second ribbon layer increases according to a measure by which the bending of the phalange exceeds the threshold bend angle, to accommodate and distribute the force generated on the composite ribbon due to the bending of the finger.

Ribbon Actuation and Interaction with Virtual Objects

In some embodiments, an actuator 270 is positioned on the glove body (e.g., to the glove body 205 of FIG. 2) and is coupled to the first and second ribbon layers 210-*a* and 210-*b* of the composite ribbon 210. The actuator 270 is configured to control movement of the first and second ribbon layers 210-*a* and 210-*b* by actuating the first and second ribbon layers. In some embodiments, the actuator 270 is configured to simultaneously adjust dimensions (e.g., the length and/or width) of both the first and second ribbon layers based at least in part on a virtual position of the glove body in a virtual space. The virtual space in a virtual reality environment is a space in which a virtual object is placed and the virtual position of the glove body is determined based on a physical position of the glove body relative to the virtual object.

The actuator 270 actuates the first and second ribbon layers 210-*a* and 210-*b* in the haptic glove 200 to control movement of the glove digit 230-*b*. In some embodiments, the actuator 270 receives stimulus signals from the console 170 for controlling movement of the glove digit 230-*b*. The actuator 270 controls movement of the glove digit 230-*b*, based on the received stimulus signals, by actuating, based on the stimulus signals, the first layer 210-*a* and in conjunction with actuating the first ribbon layer 210-*a*, actuating, based on the stimulus signals, the second ribbon layer 210-*b*. In some embodiments, the actuator 270 controls movement of the glove digit 230-*b* based on the first and second stimulus signals by actuating the first and second ribbon layers 210-*a* and 210-*b* by simultaneously adjusting lengths of both the first and second ribbon layers 210-*a* and 210-*b* based at least in part on a virtual position of the haptic glove 200 in a virtual space. The virtual space is a space in which a virtual object is placed, the virtual position of the haptic glove 200 determined based on a physical position of the haptic glove 200 relative to the virtual object.

The actuator 270 may apply linear forces to the first and second ribbon layers 210-*a* and 210-*b* to linearly translate ends of the ribbon layers 210-*a* and 210-*b* mechanically coupled to the actuator 270. In some embodiments, the actuator includes one or more solenoids that apply a variable force by varying an electrical current through a helical wire. To improve position sensing and control, the actuator 270 may include opposing magnetic poles stacked along the direction of each ribbon layer. These magnetic poles discretize the position of each tendon, acting as a magnetic detent, which simplifies position control and facilitates measurement of the ribbons' positions. Other example actuators include another magnetic mechanism, a hydraulic mechanism, a pneumatic mechanism, a piezoelectric mechanism, or a combination thereof. The actuator 270 is anchored to the glove body in the illustrated embodiment, but it may also be anchored to another element fixed relative to the user's body.

In some embodiments, the first and second ribbon layers 210-*a* and 210-*b* apply forces to the glove digit 230-*b*, based on the received stimulus signals, resulting in a force being applied to the phalange wearing the glove digit. In some embodiments, the first and second ribbon layers 210-*a* and 210-*b* are configured to apply substantially equal forces to the glove digit responsive to substantially the same stimulus signals.

In some embodiments, the first and second ribbon layers are configured to produce substantially same responses to an actuation provided by the actuator 270. For example, the first and second ribbon layers 210-*a* and 210-*b* may produce substantially the same magnitude and same polarity of length change for a given actuation signal. Alternatively, the first and second ribbon layers are configured to respond differently (e.g., have different sensitivity) to a same actuation signal.

The stimulus signals are generated by the console 170, for example, based on the responses of the first and second ribbon layers to the bend of the phalange the console 170 may provide substantially the same stimulus signals to the first and second ribbon layers, via the actuator 270, responsive to the substantially same responses of the first and second ribbon layers to the bend of the phalange. In such cases, the first and ribbon layers may be jointly and synchronously actuated by substantially the same stimulus or actuation signals to jointly apply force to resist a user movement (e.g., grabbing a virtual marshmallow), to jointly cause a user movement (e.g., flattening fingers pushed against a virtual wall), or to jointly apply isometric force (e.g., torquing the hand downward at the wrist while the user holds a virtual rock).

The actuator 270 is mechanically coupled to the composite ribbon 210 to linearly push or pull the first and second ribbon layers 210-a and 210-b. Alternatively or additionally, another activation mechanism applies force to the first and second ribbon layers 210-a and 210-b. In some embodiments, the actuator 270 is configured to simultaneously adjust the lengths, widths, or a combination thereof of both the first and second ribbon layers 210- and 210-b according to a value of hardness of the virtual object. Alternatively, or in addition, the actuator 270 is configured to simultaneously adjust the lengths, widths, or a combination thereof of both the first and second ribbon layers 210-a and 210-b responsive to a relative movement between the phalange of the user hand and another portion of the user hand. Furthermore, the actuator 270 is configured to simultaneously adjust the lengths, widths, or a combination thereof of both the first and second ribbon layers 210-a and 210-b to resist the relative movement, responsive to determining that the relative movement deforms the virtual object. Alternatively, or in addition, the actuator 270 is configured to simultaneously adjust the lengths, widths, or a combination thereof of both the first and second ribbon layers 210-a and 210-b, responsive to determining that a corresponding force of the relative movement exceeds a threshold value.

By pulling the composite ribbon 210, the actuator 270 exerts a force on the anchors 220, which exert a distributed force on the glove digit 230. As a result, the glove digit 230 torques the phalange toward the actuator 270. If the user exerts muscles to resist the torque around the joint, the glove digit 230 remains stationary. If the user's muscles do not exert enough force to counter the torque around the joint, the composite ribbon 210 pulls the portion of the user's body toward the actuator 270 by pulling the anchors 220 closer to the actuator 270 and closer to each other. For example, if an actuator 270 on the back of a user's hand pulls a composite ribbon 210 on the back of a user's finger, the actuator 270 causes the glove digit 230 to either resist flexion of the finger or cause extension of the finger. Conversely, an actuator on the palm of a user's hand may pull a composite ribbon 210 on the front of a user's finger to either resist extension of the finger or cause flexion of the finger. The actuator 270 may exert a variable force on the composite ribbon 210 to cause a variable torque around the user's joint.

In some embodiments, the glove further includes control wires 280 to convey tactile sensations from a virtual reality environment to the actuator 270. For example, responsive to the user holding a virtual object, the ribbon layers undergo compressive of tensile deformation or force and the control wires 280 convey the measured responses to the actuator 270. Conversely, the control wires 280 may also carry actuation signals from the actuator 270 to the first and second ribbon layers 210-a and 210-b.

Anchors and Ribbon Layers

Figure 3:
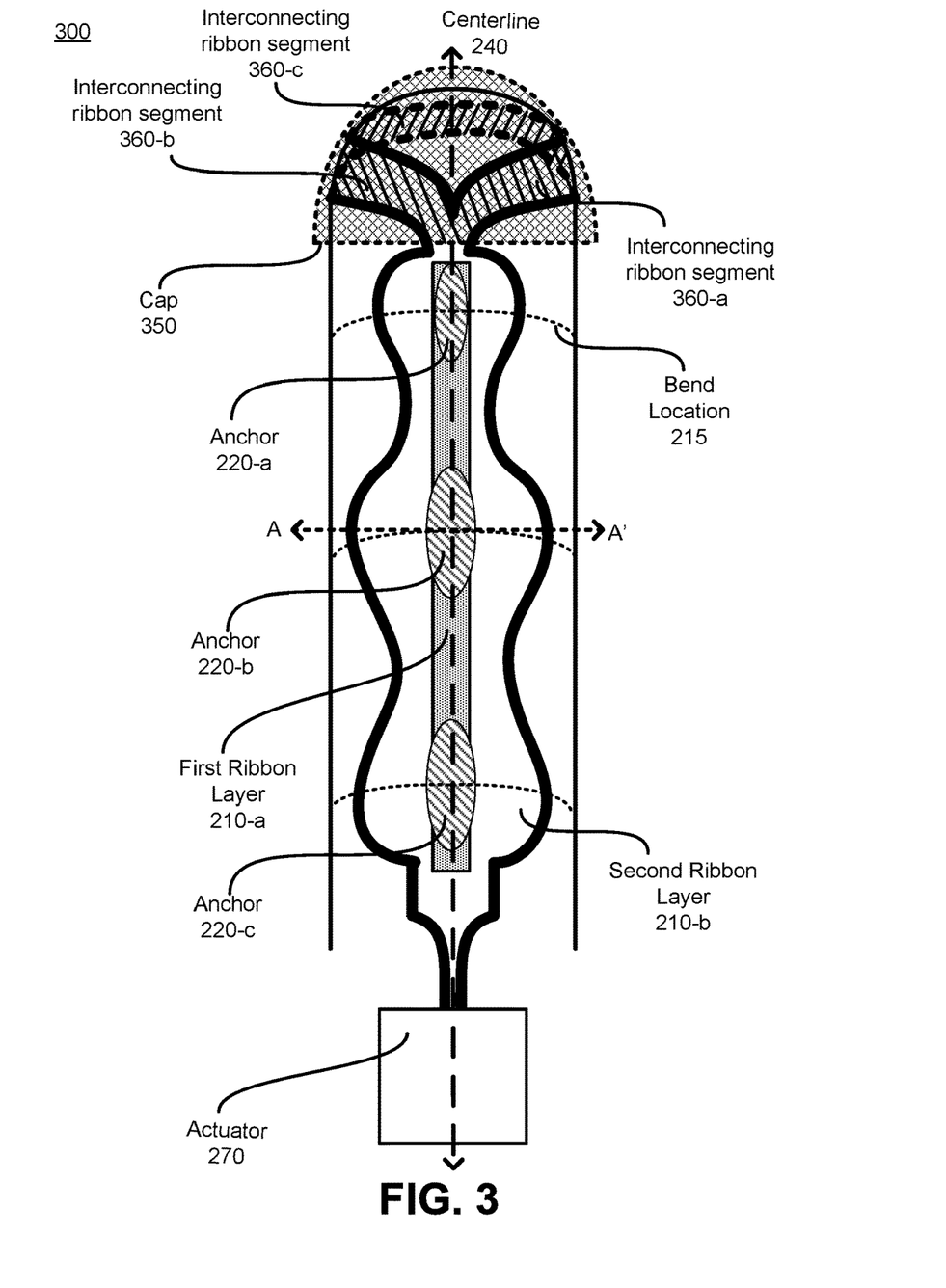
FIG. 3 illustrates a glove digit having a composite extendible ribbon, in accordance with one or more embodiments.

FIG. 3 illustrates a glove digit 300 having a composite extendible ribbon, in accordance with one or more embodiments. The glove digit 300 is substantially the same as, e.g., the glove digit 230-b, discussed above with respect to FIG. 2. The glove digit 300 has a pair of ribbon layers (including the first ribbon layer 210-a and second ribbon layer 210-b) parallel to a bend centerline 240 of a phalange, in accordance with one or more embodiments.

As illustrated in FIG. 3, an average width of the first ribbon layer 210-a is less than an average width of the second ribbon layer 210-b. The second ribbon layer 210-b optionally bulges around regions of the glove digit 300 that correspond to joints (e.g., knuckles) of the user phalange. In other words, a width of the second ribbon layer 210-b varies along the bend centerline of the phalange, the width being greater in regions of the second ribbon layer 210-b configured to be positioned over bend locations of the glove digit than in regions of the second ribbon layer to be positioned between the bend locations. The first ribbon layer 210-a distributes some of the force away from the knuckle (which could cause discomfort), by transferring tension around the knuckle through the second ribbon layer 210-b.

The glove digit 300 optionally includes a plurality of anchors 220 (e.g., including anchors 220-a, 220-b, and 220-c). Each anchor of the plurality of anchors is placed at bend location of the glove digit corresponding to a respective joint of the phalange of the user hand. As illustrated in FIG. 3, an anchor 220-a corresponds to and is configured to be positioned over a bend location 215 of the phalange.

In some embodiments, and as illustrated in FIG. 3, the second ribbon layer 210-b splits (e.g., branches) from a central axis of the second ribbon layer 210-b into ribbon segments (e.g., interconnecting ribbon segments 360-a and 360-b) which fold along lateral sides of the glove digit 300 to be interconnected (e.g., see interconnecting ribbon segment 360-c) on a surface of the glove digit 300 that is opposite to the surface on which the first and second ribbon layers 210-a and 210-b are formed. The interconnecting ribbon segments 360-a, 360-b, and 360-c are formed on an end of the glove digit (typically corresponding to a tip of the user phalange).

In such embodiments, the second ribbon layer 210-b comprises a plurality of ribbon segments (e.g., interconnecting ribbon segments 360-a and 360-b) branching from a central axis of the second ribbon layer 210-b in a region corresponding to an end of the phalange of the user hand. For example, a first ribbon segment 360-a branches toward and folds along the first lateral side of the glove digit 300 and the second ribbon segment 360-b branches toward and folds along the second lateral side of the glove digit 300.

Furthermore, in such embodiments, if the lengths of the first and second ribbon layers 210-a and 210-b are positioned on a first surface of the glove digit 300 corresponding to a back surface of the finger of a user's hand, then segments of the first and second ribbon layers 210-a and 210-b fold along sides of the finger of the user hand to be interconnected on a second surface of the glove digit corresponding to the front surface of the finger.

In such embodiments, the first and second interconnecting ribbon segments 360-a and 360-b are interconnected at an end of the glove digit 300 and the end of the glove digit 300 (at which the ribbon layers are interconnected) optionally comprises a rigid cap 350 enclosing a region where the first and second ribbon segments 360-a and 360-b are interconnected. In some embodiments, a rigid cap 350 includes a band of material (e.g., leather, plastic, etc.) positioned around (e.g., circumscribing) a segment of the glove digit adjacent to the tip of the glove digit (furthest from the base of the glove digit). Alternatively, or in addition, the rigid cap 350 corresponds to a thimble positioned around (e.g., circumscribing) the tip of the glove digit as well as a portion of the segment of the glove digit adjacent to the tip of the glove digit. In either case, the rigid cap 350 encloses (e.g., overlaps and circumscribes) the region of the glove digit 300 where the first and second tendons 210-a and 210-b are interconnected.

Figure 4:
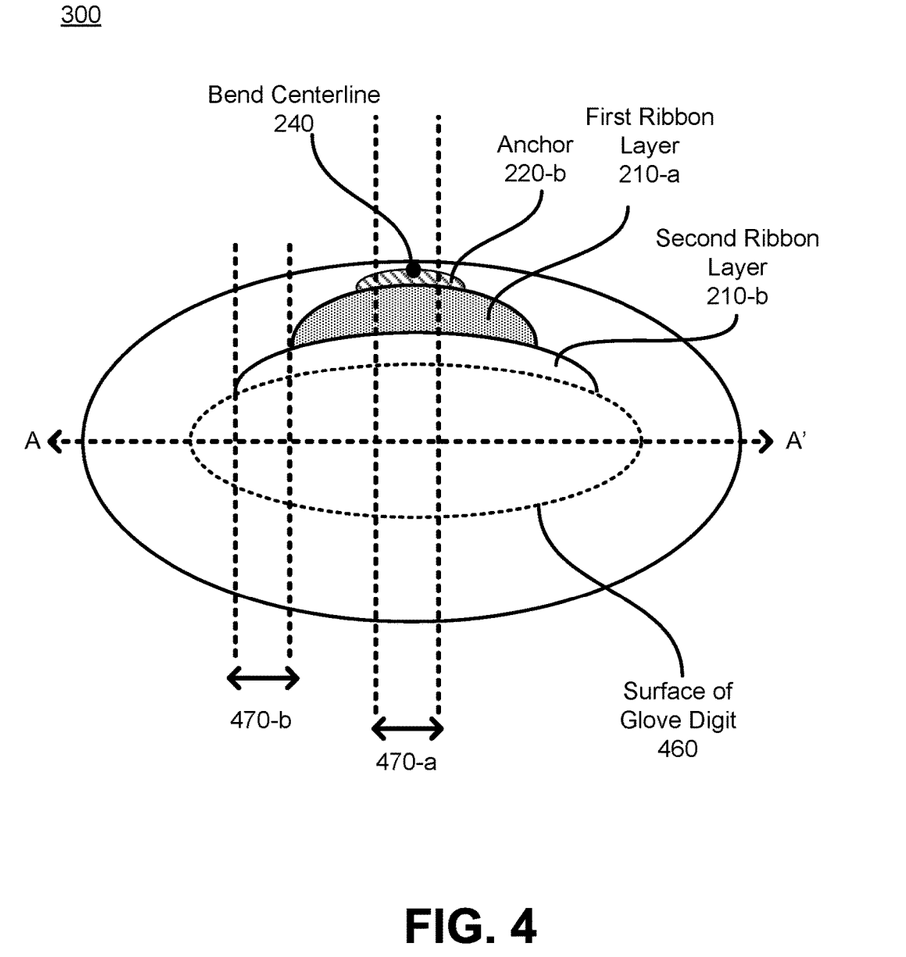
FIG. 4 illustrates a cross-sectional view of a glove digit with a composite extendible ribbon, in accordance with one or more embodiments.

FIG. 4 illustrates a cross-sectional view of the glove digit 300 of FIG. 3, in accordance with one or more embodiments. In some embodiments, the first ribbon layer 210-a has a first value of elasticity in a central region along the bend centerline 240 (e.g., in region 470-a shown in FIG. 4) and a second value of elasticity along edge regions distal from the bend centerline 240 (e.g., in region 470-b shown in FIG. 4). In some embodiments, the first value of elasticity is greater than the second value of elasticity, thus permitting a greater degree of motion of flex of the phalange nearer the center of the joint which typically undergoes greater degree of bending displacement. Variation in degree of elasticity may be obtained by using different materials for regions and having distinct elastic moduli or through design choice (e.g., the central region of the ribbon may be thicker than the region of the ribbon).

In some embodiments, the second ribbon layers 210-b has a third value of elasticity in a central region along the bend centerline 240 (e.g., in region 470-a shown in FIG. 4) and a fourth value of elasticity along edge regions distal from the bend centerline 240 (e.g., in region 470-b shown in FIG. 4). In some embodiments, the third value of elasticity is greater than the fourth value of elasticity, thus permitting a greater degree of motion of flex of the phalange nearer the center of the joint which typically undergoes greater degree of bending displacement. Variation in degree of elasticity may be obtained by using different materials for regions and having distinct elastic moduli or through design choice (e.g., the central region of the ribbon may be thicker than the region of the ribbon).

FIGS. 5A-5D illustrate deformation of a composite extendible ribbon according to different bend angles of a finger, in accordance with one or more embodiments.

Figure 5A:
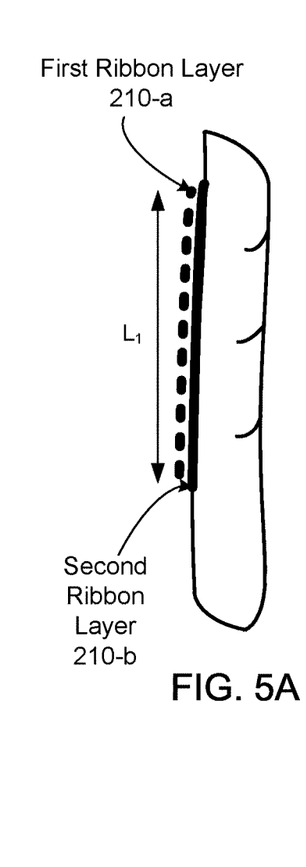
FIGS. 5A-5D illustrate deformation of a composite extendible ribbon according to different bend angles of a finger, in accordance with one or more embodiments.
Figure 5B:
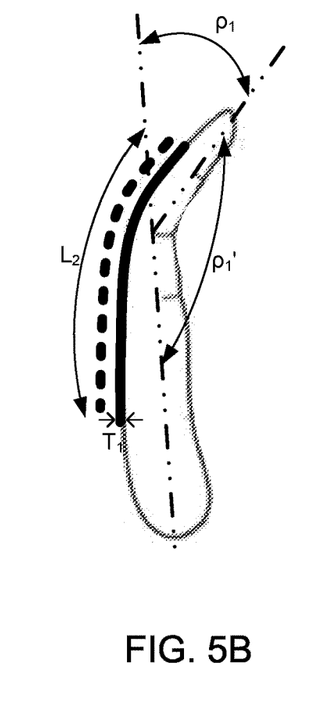
Figure 5C:
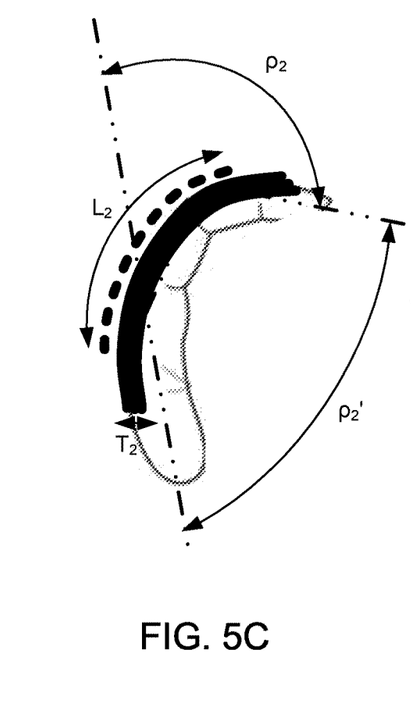
Figure 5D:
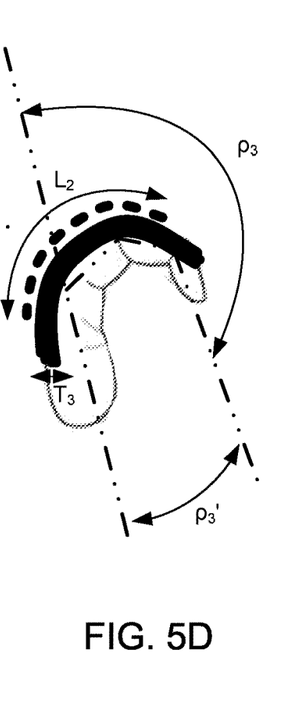

In some embodiments, the first ribbon layer 210-a is less flexible and has a lower range of elastic extendibility than the second ribbon layer 210-b. In such embodiments, and as illustrated in FIGS. 5A and 5B, the first ribbon layer 210-a stretches (e.g., from $L_1$ in FIG. 5A to $L_2$ in FIG. 5B) until a predefined threshold deformed length ($L_2$) corresponding to a predefined threshold bend angle ($\rho_1$) of the finger. In such embodiments, for a bending of the finger beyond the predefined threshold bend angle (e.g., for any bend angle greater than $\rho_1$ as illustrated in FIG. 5C-5D), the first ribbon layer 210-a does not undergo further deformation (e.g., does not increase in length beyond $L_2$) and rather remains at predefined threshold deformed length ($L_2$ in FIGS. 5C-5D) despite further bending of the finger past the predefined threshold bend angle (e.g., to bend angle $\rho_2$ or $\rho_3$ illustrated in FIGS. 5C-5D). Instead, responsive to a bend angle of the phalange being greater than the threshold bend angle (e.g., to bend angle $\rho_2$ or $\rho_3$ illustrated in FIGS. 5C-5D), a width of the second ribbon layer increases (e.g., from $T_1$ in FIG. 5B, to $T_2$ in FIG. 5C, or to $T_3$ in FIG. 5D) according to a measure by which the bending of the phalange exceeds the threshold bend angle, to accommodate and distribute the force generated on the composite ribbon due to the bending of the finger.

In such embodiments, if a bend angle of the phalange is less than a predefined threshold angle (e.g., $\rho_1$) corresponding to a predefined threshold deformed length (e.g., $L_2$) of the first ribbon layer 210-a, the actuator 270 is configured to increase a length of both the first and second ribbon layers 210-a and 210-b (e.g., from FIG. 5A to 5B) according to the bending of the phalange. On the other hand, if the bend angle of the phalange is greater than the predefined threshold angle (e.g., $\rho_1$), the actuator 270 is configured to maintain the length of the first ribbon layer 210-a at the predefined threshold deformed length (e.g., $L_2$) and to increase the length and increase a width of the second ribbon layer 210-b (e.g., from $T_1$ in FIG. 5B, to $T_2$ in FIG. 5C, or to $T_3$ in FIG. 5D) according to the bending of the phalange. In other words, the actuator limits a length of the first ribbon layer 210-a to a predefined threshold deformed length (e.g., $L_2$) corresponding to a threshold bend angle (e.g., $\rho_1$) of the phalange, the predefined threshold deformed length (e.g., $L_2$) within the first range of elastic extensibility of the first extendible material. Responsive to a bend angle of the phalange being greater than the threshold bend angle (e.g., bend angle $\rho_2$ or $\rho_3$ illustrated in FIGS. 5C-5D), increases a width of the second ribbon layer (e.g., from $T_1$ in FIG. 5B, to $T_2$ in FIG. 4C, or to $T_3$ in FIG. 5D) according to a measure by which the bending of the phalange exceeds the threshold bend angle.

While some of the preceding discussion of the embodiments refers to a virtual reality garment such as a glove that encloses a user's hand or figures, in other embodiments, the composite ribbons described herein can be adapted to other types of garments that apply force to other parts of the body (e.g., elbows, torso, knees, or ankles). In some embodiments, the haptic feedback mechanism may be part of garment worn on another portion of the body. For example, the haptic feedback mechanism may be a sleeve wearable around a joint such as a wrist, elbow, or knee. Using the composite ribbon positioned along the wrist, elbow, or knee, but on opposite sides of a bend centerline of the wrist, elbow, or knee, the sleeve may torque the joint to simulate weight of a virtual object. The sleeve may vary the orientation of the applied torque according to an orientation of the joint tracked by the System. For example, as a user lifts a heavy virtual object from the user's waist to the user's shoulder, the composite ribbon around and on either side of the user's wrist synchronously apply a downward torque around the user's wrist to simulate gravitational force on the virtual object. The sleeve applies torque in in an orientation consistent with gravity according to the joint's orientation relative to gravity.

Additional Configuration Considerations

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:
1. A haptic glove comprising:
  a glove body including a glove digit corresponding to a phalange of a user hand, the glove digit having:
    a first ribbon layer of a first average width configured to be positioned on a first surface of the glove digit and formed lengthwise along a bend centerline of the glove digit that bisects a surface of the glove digit, the first ribbon layer comprising a first extendible material having a first range of elastic extensibility, and a second ribbon layer of a second average width greater than the first average width, the second ribbon layer configured to be positioned on the first surface of the glove digit and formed lengthwise along the bend centerline of the glove digit, a central axis of the second ribbon layer aligned with a central axis of the first ribbon layer, the second ribbon layer comprising a second extendible material having a second range of elastic extensibility greater than the first range of elastic extensibility of the first ribbon layer, wherein an actuator coupled to the glove body and the first and second ribbon layers is configured to control movement of the glove digit by actuating one or more control wires that are coupled to the first and second ribbon layers.

2. The glove of claim 1, wherein a width of the second ribbon layer varies along the bend centerline of the glove digit, the width being greater in regions of the second ribbon layer configured to be positioned over bend locations of the glove digit than in regions of the second ribbon layer to be positioned between the bend locations.

3. The glove of claim 1, wherein the glove digit further comprises a plurality of anchors, each anchor of the plurality of anchors connected to the first ribbon layer, to the second ribbon layer, and to the glove digit and configured to be positioned at a respective bend location of the glove digit.

4. The glove of claim 1, wherein the second ribbon layer comprises a material having a range of elasticity between 5-50 MPa.

5. The glove of claim 1, wherein the second ribbon layer comprises a plurality of ribbon segments branching from a central axis of the second ribbon layer at a region corresponding to a tip of the glove digit, the plurality of ribbon segments including:

a first ribbon segment branching toward and folding along a first lateral side of the glove digit; and a second ribbon segment branching toward and folding along a second lateral side of the glove digit, wherein the first and second ribbon segments are interconnected on a portion of the glove digit that corresponds to a second surface of the glove digit that is opposite to the first surface of the glove digit.

6. The glove of claim 5, wherein the glove digit further comprises a rigid cap enclosing a region of the glove digit where the first and second ribbon segments of the second ribbon layer are interconnected.

7. The glove of claim 1, wherein the first ribbon layer has a first value of elasticity in a first region within a first predefined distance of the bend centerline and a second value of elasticity in a second region greater than a second predefined distance from the bend centerline, the second predefined distance being greater than the first predefined distance and the first value being greater than the second value.

8. The glove of claim 1, wherein the second ribbon layer has a first value of elasticity in a first region within a first predefined distance of the bend centerline and a second value of elasticity in a second region greater than a second predefined distance from the bend centerline, the second predefined distance being greater than the first predefined distance and the first value being greater than the second value.

9. The glove of claim 1, wherein the actuator coupled to the glove body is further configured to control movement of the first and second ribbon layers by providing stimulus signals to the first and second ribbon layers, wherein the stimulus signals are generated based on responses of the first and second ribbon layers to a bend of the glove digit.

10. The glove of claim 9, wherein responsive to a bending of the glove digit:

if a bend angle of the glove digit is less than or equal to a predefined threshold angle corresponding to a predefined threshold deformed length of the first ribbon layer, the actuator is configured to increase a length of both the first and second ribbon layers according to the bending of the glove digit, and if the bend angle of the glove digit is greater than the predefined threshold angle, the actuator is configured to maintain the length of the first ribbon layer at the predefined threshold deformed length and to increase the length and increase a width of the second ribbon layer according to the bending of the glove digit.

11. The glove of claim 9, wherein the actuator is configured to:

limit a length of the first ribbon layer to a predefined threshold deformed length corresponding to a threshold bend angle of the glove digit, the predefined threshold deformed length within the first range of elastic extensibility of the first extendible material; and responsive to a bend angle of the glove digit being greater than the threshold bend angle, increase a width of the second ribbon layer according to a measure by which the bending of the glove digit exceeds the threshold bend angle.

12. The glove of claim 1, wherein the an actuator coupled to the glove body is further configured to adjust dimensions of the first and second ribbon layers based at least in part on a virtual position of the glove body in a virtual space, the virtual space in which a virtual object is placed, the virtual position of the glove body determined based on a physical position of the glove body relative to the virtual object.

13. The glove of claim 12, wherein the actuator is configured to simultaneously adjust lengths of both the first and second ribbon layers according to a value of hardness of the virtual object.

14. The glove of claim 12, wherein the actuator is configured to simultaneously adjust lengths of both the first and second ribbon layers responsive to a relative movement between the phalange of the user hand and another portion of the user hand.

15. A wearable device comprising:

a wearable garment including a sleeve corresponding to a human body part, the sleeve having:

a first ribbon layer of a first average width configured to be positioned on a first surface of the sleeve and formed lengthwise along a bend centerline of the sleeve that bisects a surface of the sleeve, the first ribbon layer comprising a first extendible material having a first range of elastic extensibility, and a second ribbon layer of a second average width greater than the first average width, the second ribbon layer configured to be positioned on the first surface of the sleeve and formed lengthwise along the bend centerline of the sleeve, a central axis of the second ribbon layer aligned with a central axis of the first ribbon layer, the second ribbon layer comprising a second extendible material having a second range of elastic extensibility greater than the first range of elastic extensibility of the first ribbon layer, wherein an actuator coupled to the wearable garment and the first and second ribbon layers is configured to control movement of the wearable garment by actuating one or more control wires that are coupled to the first and second ribbon layers.

16. The wearable device of claim 15, wherein a width of the second ribbon layer varies along the bend centerline of the sleeve, the width being greater in regions of the second ribbon layer configured to be positioned over bend locations of the sleeve than in regions of the second ribbon layer to be positioned between the bend locations.

17. The wearable device of claim 15, wherein the actuator coupled to the wearable garment is further configured to adjust dimensions of the first and second ribbon layers based at least in part on a virtual position of the wearable garment in a virtual space, the virtual space in which a virtual object is placed, the virtual position of the wearable garment determined based on a physical position of the wearable garment relative to the virtual object.

18. The wearable device of claim 15, wherein the sleeve is part of a haptic glove.

19. A haptic glove comprising:
a glove body including a glove digit corresponding to a phalange of a user hand, the glove digit having:
    a first ribbon layer of a first average width configured to be positioned on a first surface of the glove digit and formed lengthwise along a bend centerline of the glove digit that bisects a surface of the glove digit, the first ribbon layer comprising a first extendible material having a first range of elastic extensibility, and
    a second ribbon layer of a second average width greater than the first average width, the second ribbon layer configured to be positioned on the first surface of the glove digit and formed lengthwise along the bend centerline of the glove digit, a central axis of the second ribbon layer aligned with a central axis of the first ribbon layer, the second ribbon layer comprising a second extendible material having a second range of elastic extensibility greater than the first range of elastic extensibility of the first ribbon layer;
one or more control wires coupled to the first and second ribbon layers; and
an actuator coupled to the glove body and the first and second ribbon layers, the actuator configured to actuate the first and second ribbon layers to control movement of the glove digit using the one or more control wires.

* * * * *